US009635689B2

(12) United States Patent
Hao et al.

(10) Patent No.: US 9,635,689 B2
(45) Date of Patent: Apr. 25, 2017

(54) DELIVERY CHANNEL SELECTION AND APPLICATION LAYER HANDOVER OF PROGRAMS FOR A MOBILE SERVICE

(75) Inventors: Jack Jianxiu Hao, Lexington, MA (US); Diego S. Rozensztejn, Brighton, MA (US); Guillermo Ortiz, Woburn, MA (US); Xuefeng Yao, Waban, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1292 days.

(21) Appl. No.: 13/220,759

(22) Filed: Aug. 30, 2011

(65) Prior Publication Data

US 2013/0055301 A1     Feb. 28, 2013

(51) Int. Cl.
| | |
|---|---|
| *H04N 5/445* | (2011.01) |
| *H04W 76/00* | (2009.01) |
| *H04N 7/173* | (2011.01) |
| *H04W 36/00* | (2009.01) |
| *H04N 21/2385* | (2011.01) |
| *H04N 21/44* | (2011.01) |
| *H04N 21/475* | (2011.01) |
| *H04N 21/6405* | (2011.01) |
| *H04N 21/6408* | (2011.01) |
| *H04H 20/42* | (2008.01) |
| *H04H 20/57* | (2008.01) |
| *H04N 21/25* | (2011.01) |
| *H04N 21/258* | (2011.01) |
| *H04N 21/414* | (2011.01) |
| *H04N 21/4335* | (2011.01) |
| *H04N 21/24* | (2011.01) |
| *H04W 36/02* | (2009.01) |

(Continued)

(52) U.S. Cl.
CPC ........ *H04W 76/002* (2013.01); *H04H 20/423* (2013.01); *H04H 20/57* (2013.01); *H04N 5/445* (2013.01); *H04N 7/173* (2013.01); *H04N 21/2385* (2013.01); *H04N 21/251* (2013.01); *H04N 21/25891* (2013.01); *H04N 21/41407* (2013.01); *H04N 21/44004* (2013.01); *H04N 21/4758* (2013.01); *H04N 21/6405* (2013.01); *H04N 21/6408* (2013.01); *H04W 36/00* (2013.01); *H04H 60/31* (2013.01); *H04H 60/33* (2013.01); *H04N 21/2401* (2013.01); *H04N 21/4335* (2013.01); *H04W 36/023* (2013.01); *H04W 72/005* (2013.01)

(58) Field of Classification Search
CPC ...................... H04N 21/2401; H04N 21/4335
USPC .......................................... 725/14, 54, 94, 95
See application file for complete search history.

(56) References Cited

U.S. PATENT DOCUMENTS

| | | | |
|---|---|---|---|
| 8,199,719 B2 * | 6/2012 | Taneja | 370/331 |
| 2007/0281712 A1 * | 12/2007 | Povey et al. | 455/456.1 |

(Continued)

*Primary Examiner* — Pankaj Kumar
*Assistant Examiner* — Sahar Baig

(57) ABSTRACT

Methods and devices provide channel assignments of programs delivered in a mobile setting. The channel assignments include unicast channels, multicast channels, and broadcast channels. The channel assignments are based on one or more of the type of program, user viewership information, or user voting information. Additionally, methods and devices provide for handover between mobile service areas at the application layer. Programs are buffered based on a handover time. During the handover, the buffered portion of the program is played.

20 Claims, 13 Drawing Sheets

(51) Int. Cl.
    *H04W 72/00*    (2009.01)
    *H04H 60/31*    (2008.01)
    *H04H 60/33*    (2008.01)

(56) References Cited

U.S. PATENT DOCUMENTS

| | | | |
|---|---|---|---|
| 2007/0291744 A1* | 12/2007 | Lundberg et al. | 370/352 |
| 2009/0249418 A1* | 10/2009 | Alastruey Gracia et al. | 725/114 |
| 2010/0215021 A1* | 8/2010 | Li et al. | 370/331 |
| 2010/0229204 A1* | 9/2010 | De Nijs et al. | 725/62 |
| 2012/0320814 A1* | 12/2012 | Chen et al. | 370/312 |
| 2013/0023281 A1* | 1/2013 | Meredith et al. | 455/456.1 |

* cited by examiner

| PROGRAMS | MOBILE SERVICE AREA 1 | MOBILE SERVICE AREA 2 | MOBILE SERVICE AREA 3 | MOBILE SERVICE AREA 4 | MOBILE SERVICE AREA 5 |
|---|---|---|---|---|---|
| PROGRAM 1 | 5 | 200 | 100 | 10 | 20 |
| PROGRAM 2 | 0 | 50 | 1 | 0 | 0 |
| PROGRAM 3 | 1 | 5 | 1 | 0 | 0 |
| PROGRAM 4 | 2 | 100 | 50 | 5 | 10 |
| PROGRAM 5 | 2 | 1 | 1 | 0 | 0 |

Fig. 4A

| BROADCAST CHANNELS | MOBILE SERVICE AREA 1 | MOBILE SERVICE AREA 2 | MOBILE SERVICE AREA 3 | MOBILE SERVICE AREA 4 | MOBILE SERVICE AREA 5 |
|---|---|---|---|---|---|
| CHANNEL 1 | PROGRAM 1 | PROGRAM 1 | PROGRAM 1 | PROGRAM 1 | PROGRAM 1 |
| CHANNEL 2 | PROGRAM 4 | PROGRAM 4 | PROGRAM 4 | PROGRAM 4 | PROGRAM 4 |
| CHANNEL 3 | PROGRAM 5 | PROGRAM 2 | ANY | ANY | ANY |

Fig. 4B

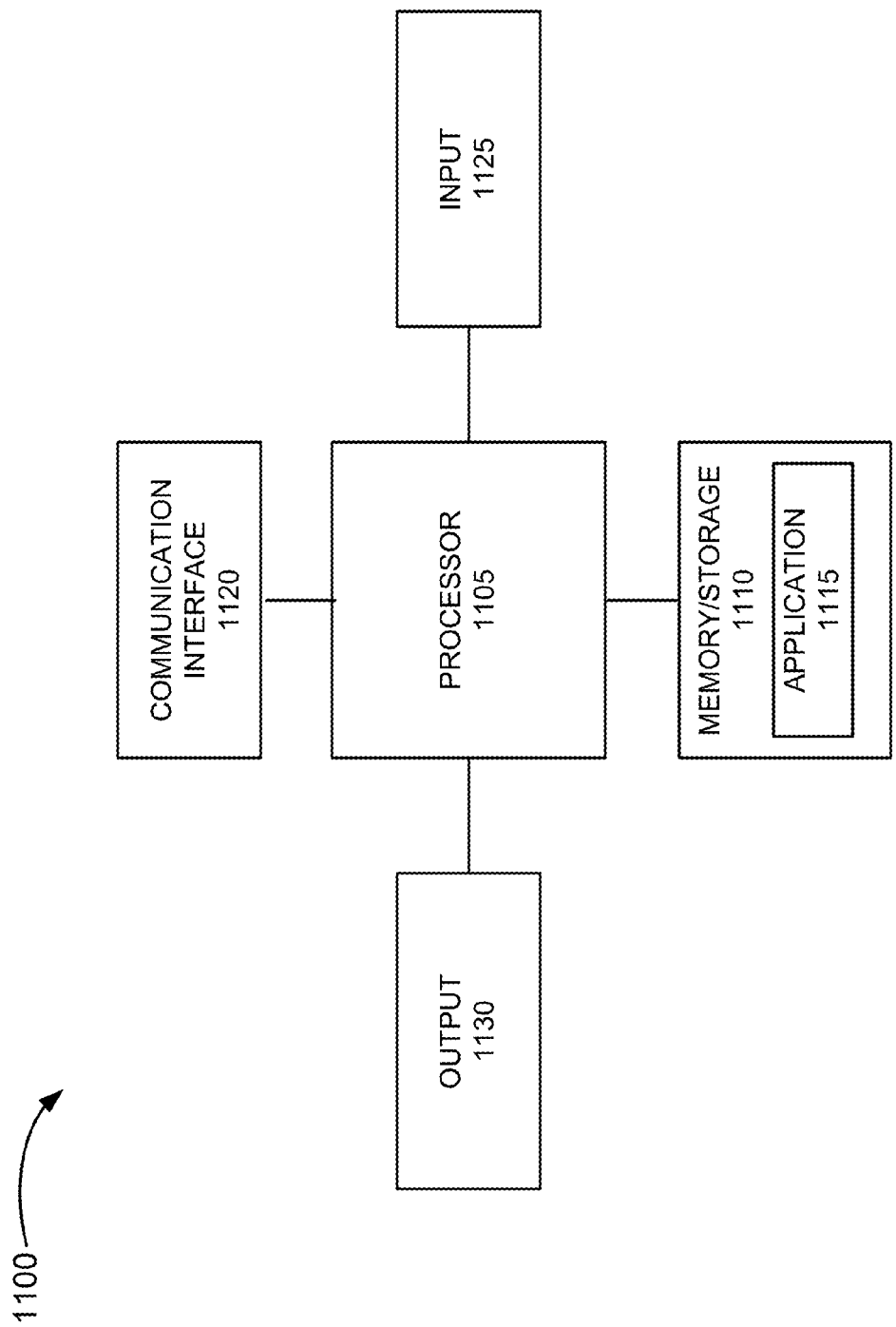

1

DELIVERY CHANNEL SELECTION AND APPLICATION LAYER HANDOVER OF PROGRAMS FOR A MOBILE SERVICE

BACKGROUND

Mobile devices, such as mobile phones, smart phones, tablets, and other portable devices, are pervasive among users. As a result, service providers and network providers continue to strive to improve wireless services, in terms of types of service (e.g., location-aware services, multimedia services, etc.), access, performance, etc. Given the growing demand for wireless service, wireless bandwidth is gradually becoming a precious commodity.

BRIEF DESCRIPTION OF THE DRAWINGS

FIG. 4A is a diagram illustrating exemplary program selection and mobile service area information;

FIG. 4B is a diagram illustrating an exemplary assignment of channels-to-programs;

FIG. 11 is a diagram illustrating exemplary components of a device that may correspond to one or more of the devices in the exemplary environments previously illustrated and described.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "program," as used herein, includes video content. For example, the program may be television video content (e.g., a movie, a television show, pay-per-view content, video-on-demand content, etc.) or Internet content (e.g., a webcast, a videocast, a podcast, etc.).

The term "mobile service area," as used herein, is intended to include a geographic area associated with a wireless service. For example, a cell and a cell sector (e.g., a sub-area of the cell) represent a geographic area within a cellular network. Alternatively, in a non-cellular network (e.g., Wireless Local Area Network (WLAN), WiFi, etc.), other types of geographic areas may be exist based on wireless coverage provided by a node or node of the non-cellular network. A mobile service area may also include multiple cells, cell sectors, or other types of geographic areas.

Wireless bandwidth is a limited resource. Due to the continuous increase in user demand, content delivery systems should be designed to use the available wireless bandwidth efficiently. For example, with the wireless bandwidth demands associated with the delivery of programs (e.g., videos) in a mobile setting, programs may be delivered in a unicast, multicast, or broadcast manner. If a program is viewed by more than one person, then the broadcasting or multicasting of the program is more economical (e.g., in terms of resource utilization, etc.) than unicasting. Additionally, in practice, a wireless network may have a limited number of channels allocated for broadcasting and multicasting programs.

Figure 1:
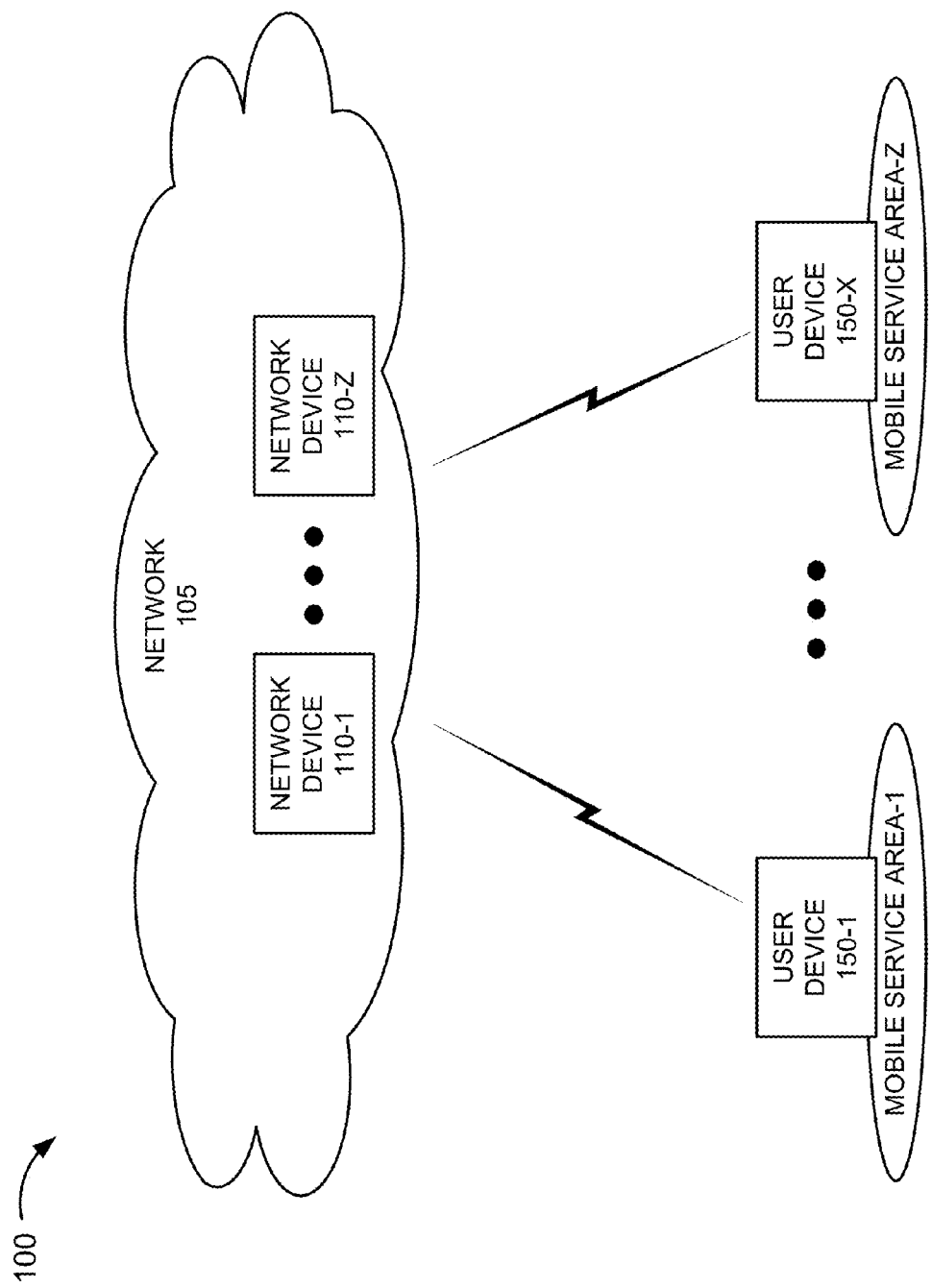
FIG. 1 is a diagram illustrating an exemplary environment in which an exemplary embodiment for delivery channel selection and application layer handover of programs may be implemented.

FIG. 1 is a diagram illustrating an exemplary environment in which an exemplary embodiment for delivery channel selection and application layer handover of programs may be implemented. As illustrated, environment 100 includes a network 105 having network devices 110-1 through 110-Z, in which Z>1 (referred to collectively as network devices 110 or individually as network device 110), and user devices 150-1 through 150-X, in which X>1, (referred to collectively as user devices 150 or individually as user device 150). As further illustrated, user devices 150 may reside in different mobile service areas. For example, user device 150-1 may reside in a mobile service area-1 and user device 150-X may reside in a mobile service area-Z.

The number of devices and networks, and the configuration in environment 100 are exemplary and provided for simplicity. According to other embodiments, environment 100 may include additional devices, fewer devices, different devices, and/or differently arranged devices, than those illustrated in FIG. 1.

According to other embodiments, a single device may be implemented as multiple devices and/or multiple devices may be implemented as a single device. A device may be implemented according to a centralized computing architecture or a distributed computing architecture. Additionally, a device may be implemented according to one or multiple network architectures (e.g., a client device, a server device, a peer device, or a combination thereof).

Also, according to other embodiments, one or more functions and/or processes described as being performed by a particular device may be performed by a different device, or some combination of devices. By way of example, one or more functions and/or processes described as being performed by network device 110 may be performed by user device 150, or vice versa, or in combination.

Network 105 includes one or more networks. Network 105 includes a wireless network (e.g., mobile network, cellular network, non-cellular network, etc.). By way of example, the wireless network may corresponds to a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (Wi-MAX) network, an Institute of Electrical and Electronics Engineers (IEEE) 802.X network, a Evolution Data Optimized (EV-DO) network, a Long Term Evolution (LTE) network, a wireless Internet Protocol (IP) network, and/or another type of wireless network (e.g., an ad hoc network, etc.). Network 105 includes networks that support the unicasting, multicasting, and broadcasting of programs to users. Network 105 may also include a wired network.

Network devices 110 include devices having the capability to communicate with other devices, systems, networks, and/or the like. For example, network devices 110 may include wireless devices (e.g., base stations (BSs), Node Bs, base transceiver stations (BTSs), radio nodes, evolved Node Bs (eNBs), repeaters, relays, base station controllers (BSCs), etc.) to allow user devices 150 to access network 105. Network devices 110 also include devices for providing a program delivery service to users. The program delivery service includes unicasting, multicasting, and broadcasting programs. Network devices 110 are described further below.

User device 150 includes a device having the capability to communicate with other devices, systems, networks, and/or the like. For example, user device 150 may take the form of a smartphone, a computer (e.g., a laptop, a palmtop, etc.), a personal digital assistant (PDA), a personal communication system (PCS) terminal, a pervasive computing device, a video playing device, or some other type of mobile device (e.g., a vehicle-based communication system, etc.).

According to an exemplary embodiment, a network device (e.g., network device 110) determines whether a program is delivered to a user using a unicast channel, a multicast channel, or a broadcast channel. According to an exemplary embodiment, the network device determines between unicasting or broadcasting a program based on past user viewing statistics associated with the program and/or similar program(s) in a mobile service area. According to another exemplary embodiment, the network device determines between unicasting or broadcasting a program based on user voting, which may be implemented, for example, via a mobile application and/or a web interface. According to yet another exemplary embodiment, the network device determines between unicasting or broadcasting of a program based on whether the program is a sponsored event. For example, a content provider or an advertisement agency may sponsor a program for broadcasting. According to still another embodiment, the network device determines between unicasting or multicasting a program based on a subscription-based event. For example, a third party may coordinate among users to view a program. According to this scenario, the program may be multicasted to those users.

According to an exemplary embodiment, a network device determines the type of delivery on a periodic basis. For example, the network device may determine the type of delivery for a program, in a particular mobile service area, every half-hour or some other time period that corresponds to the timeslot of the program. Additionally, or alternatively, the network device determines the type of delivery in real-time. For example, the network device continually monitors and evaluates up-to-date viewing statistics, voting, and/or other criterion, in a real-time, to determine the type of delivery of a program in a mobile service area.

As described above, the delivery of programs is determined for a particular mobile service area. When a user is viewing a program in one mobile service area and moves to another mobile service area, a handoff may take place. However, in some situations, the delivery of the program may be different between two mobile service areas. For example, the program may be broadcast to the user in one mobile service area, but in the other mobile service area, the program may be delivered in a unicast fashion. According to another example, the user may be moving from a mobile service area that unicasts the program to a mobile service area that broadcasts the program.

According to an exemplary embodiment, when a user begins to view a program, a mobile application of a user device (e.g., user device 150) buffers video data of the program. In contrast to other approaches, when a user moves from one mobile service area (e.g., mobile service area-1) to another service area (mobile service area-Z), the handover is managed, at least in part, at the application layer (e.g., the mobile application that plays the program). For example, during the handover, the user may view buffered video data of the program. The duration of the program that is buffered depends on the amount of time needed to complete the handover. According to an exemplary embodiment, the amount of buffering time may be based on a handover prediction time. According to another exemplary embodiment, an advance handover notification is used to minimize the amount of buffering time.

Figure 2:
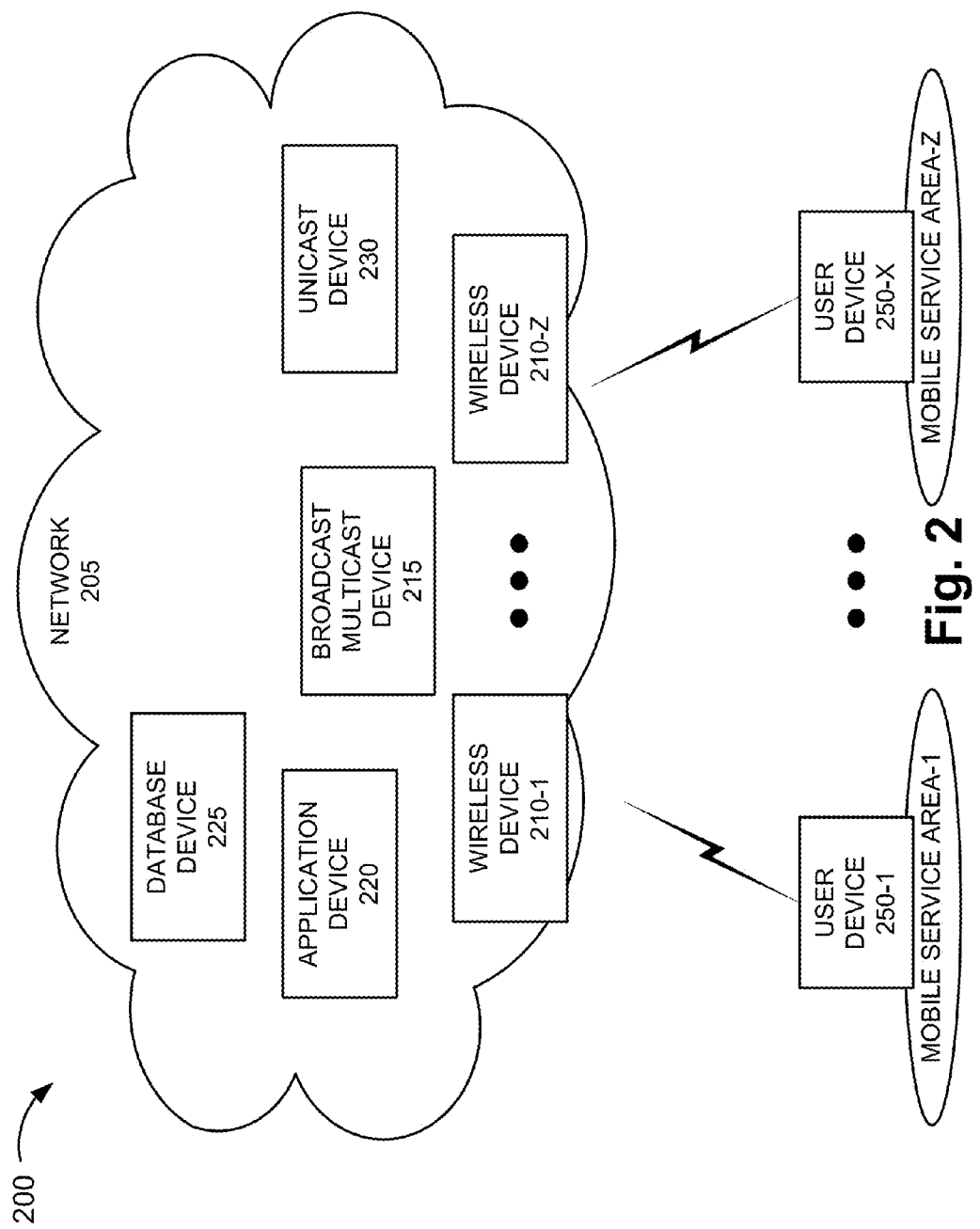
FIG. 2 is a diagram illustrating another exemplary environment in which an exemplary embodiment for delivery channel selection and application layer handover of programs may be implemented.

FIG. 2 is a diagram illustrating another exemplary environment in which an exemplary embodiment for delivery channel selection and application layer handover of programs may be implemented. As illustrated, environment 200 includes a network 205 including wireless devices 210-1 through 210-Z, in which Z>1 (referred to as wireless devices 210 or wireless device 210), a broadcast multicast device 215, an application device 220, a database device, and a unicast device 230.

Wireless devices 210 include network devices having wireless communicative capabilities that provide access to network 205. For example, wireless device 210 may take the form of a base station (BS), an enhanced Node B (eNB), etc.

Broadcast multicast device 215 includes a network device that provides for the delivery of programs via multicast and broadcast channels. For example, broadcast multicast device 215 may take the form of a Multimedia Broadcast Multicast Service (MBMS) device, a Digital Video Broadcasting-Handheld (DVB-H) device, a Digital Multimedia Broadcasting (DMB) device, or a DVB-Next Generation Handheld (DVB-NGH) device.

Application device 220 includes a network device that supports various services related to user connections with network 205 and mobile service including program delivery. For example, application device 220 may provide or support user authentication, authorization, and billing. Application device 220 may also provide or support program delivery services. For example, application device 220 may facilitate handovers and manage programs-to-broadcast and multicast channel assignments. Application device 220 may take the form of a computational device, such as a server device, an application server, an Authentication, Authorization, and Accounting (AAA) device, and/or other suitable network device(s).

Database device 225 includes a network device that stores data and/or information. Database device 225 may include databases (e.g., a relational database, a distributed database, or other type of suitable database) pertaining to the management of channel assignments for programs. For example, database device 225 may include databases pertaining to user viewership of programs, user voting, and channel assignments for programs. Database device 225 may take the form of a computational device, such as, for example, a server or other form of database management system.

Unicast device 230 includes a network device that provides for the delivery of programs via unicast channels. User device 250 is a device similar to user device 150.

As previously described, according to an exemplary embodiment, a network device determines whether a program is delivered to a user using a unicast channel, a multicast channel, or a broadcast channel. According to an exemplary embodiment, the network device determines between unicasting or broadcasting a program based on past user viewing statistics associated with the program and/or similar program(s) in a mobile service area, user voting, and/or whether the program is a sponsored event. The network device also determines between unicasting or multicasting a program based on a subscription-based event.

Figure 3:
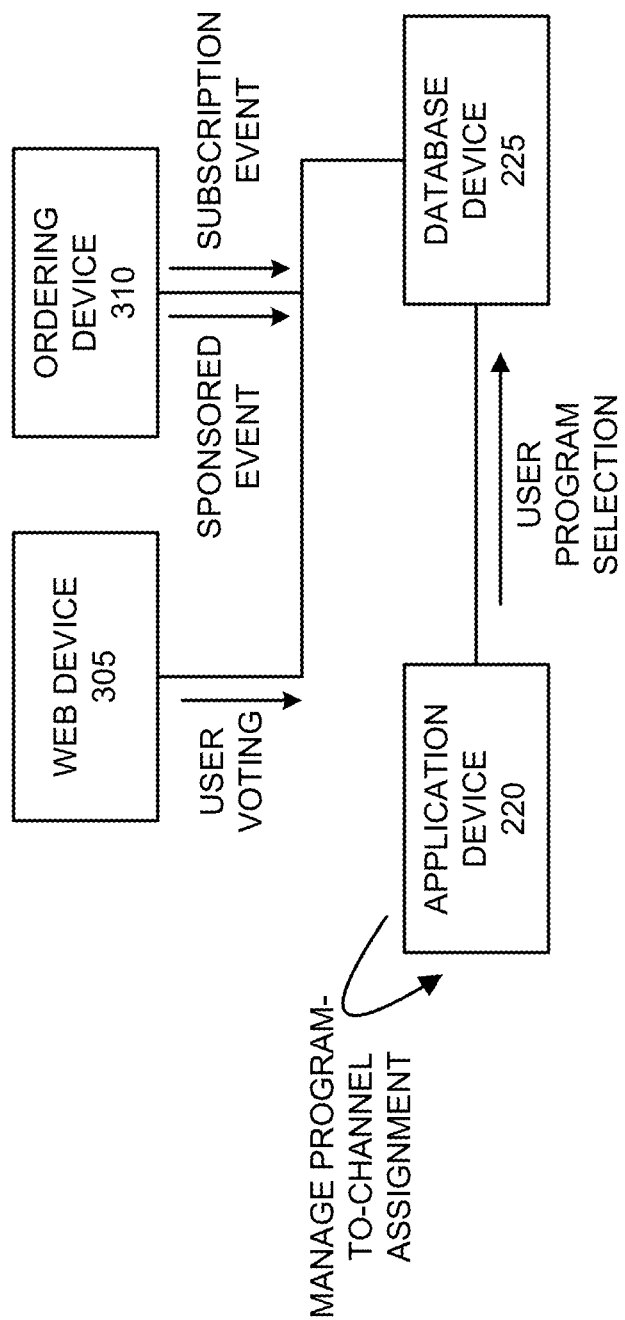
FIG. 3 is a diagram illustrating exemplary devices for managing program channel assignments.

FIG. 3 is a diagram illustrating exemplary devices for managing program channel assignments. According to an exemplary embodiment, application device 220 manages program-to-channel assignments. According to such an embodiment, application device 220 determines which programs are unicasted, multicasted, and broadcasted and assigns these programs to the appropriate channels (e.g., broadcast channels, multicast channels, unicast channels). Application device 220 manages the program-to-channel assignments based on information and/or data stored by database device 225.

According to an exemplary embodiment, application device 220 correlates programs to channels based on user viewing information. For example, when a user of user device 250 selects a program to view, application device 220 may receive this information (e.g., as a program request) or another device (not illustrated) may receive this information and this information is subsequently communicated to application device 220. In addition to the program selected by the user, application device 220 may obtain the mobile service area at which the selected program is being viewed. For example, if the user views the program while located in mobile service area 1, this information may be obtained. In cases when the user moves from one mobile service area to another mobile service area, the mobile service area may be identified as multiple mobile service areas. Alternatively, the mobile service area may be identified as the area at which the majority of the program is viewed or the area at which the program was initially viewed (e.g. a source mobile service area).

The program selection and mobile service area information is collected, stored in database device 225, and used to correlate programs to channels. For example, according to an exemplary embodiment, application device 220 identifies which mobile service area(s) have the highest viewership for a particular program. Application device 220 assigns these programs to broadcast channels. Application device 220 may also determine, based on the program selection and mobile service area information, whether adjacent mobile service areas may be assigned the same broadcast channels-to-programs. In this way, handover processes between adjacent mobile service areas may be optimized.

An example of program selection and mobile service area information is illustrated in FIG. 4A. As illustrated, programs 1-5 are mapped to mobile service areas 1-5. For example, for program 1, mobile service area 1, there are five users that viewed program 1; for program 1, mobile service area 2, there are two hundred users that viewed program 1; for program 1, mobile service area 3, there are one hundred users that viewed program 1; for program 1, mobile service area 4, there are ten users that viewed program 1; and for program 1, mobile service area 5, there are twenty users that viewed program 1.

The program selection and mobile service area information may correspond to historical data or real-time data. According to an exemplary embodiment, the number of users that viewed a program may include similar programs or the program may represent a category of programs. For example, program 1 may represent courtroom TV shows (e.g., Judge Judy, Divorce Court, etc.). The number of users may represent viewership over any span of time (e.g., a month, a week, a day, currently, etc.). Additionally, the number of users may represent an actual number of users or an average number of users over the span of time. For example, in some instances, some users may not watch the entire program. Thus, the number of users may change over time and an average number of users may be calculated.

Based on the program selection and mobile service area information, application device 220 assigns channels to each of the programs. According to an exemplary embodiment, the selection of channel assignment-to-program is based on the number of users-to-mobile service area information. For example, according to an exemplary implementation, the mobile service area that has the highest number of users viewing the program relative to other programs viewed in that mobile service area, application device 220 assigns this program to a broadcast channel. Additionally, for example, according to an exemplary implementation, the mobile service area that has the highest number of users viewing the program relative to other mobile service area(s), application device 220 assigns this program to a broadcast channel.

Depending on the number of available broadcast channels, other channel assignment schemes may be used. For example, instead of a highest number of users criterion, the selection of channels may be based on a threshold number of users. Additionally, other factors may be considered. For example, depending on the program, historical data may not exist. By way of example, court TV programs typically air the same time, on the same channel, Monday through Friday. In contrast, other types of programs (e.g., movies, award shows (e.g., Academy awards, etc.), etc.) air once and not on a regular basis. Based on these distinctions, application device 220 may assign programs to channels based on other criterion, such as, genre of program, extent of advertising, etc. In this regard, some programs may be associated with, for example, special identifiers to allow application device 220 to distinguish these types of programs from other programs. For example, as described further below, programs may be associated with various types of metadata.

According to an exemplary embodiment, application device 220 may assign programs to channels on a periodic basis. For example, application device 220 may assign programs to channels every half-hour, hour, or some other period of time that corresponds to the airing of the programs being assigned a channel.

FIG. 4B is a diagram illustrating an exemplary assignment of channels-to-programs based on the selection of programs and mobile service area information illustrated in FIG. 4A. Referring to FIG. 4B, the channel assignments correspond to broadcast channels. In this example, it may be assumed that there are three broadcast channels available in mobile service areas 1-5. For example, the mobile service areas may correspond to sectors in a cell.

As illustrated, program 1 is assigned to a broadcast channel 1 for each of the mobile service areas 1-5. Referring to FIG. 4A, program 1 has the highest number of users viewing program 1 across each of the mobile service areas relative to the other programs. Additionally, referring back to FIG. 4B, program 2 is assigned to a broadcast channel 2 for each of the mobile service areas 1-5. Similar to program 1, program 2 has the second highest number of users viewing program 2 across each of the mobile service areas relative to the remaining programs. Referring back to FIG.

4A, application device 220 selects the highest number of users relative to programs 2, 3 and 5 and mobile service areas 1-5. For example, as illustrated in FIG. 4A, program 5 has the highest number of users in mobile service area 1 and program 2 for mobile service area 2. Thus, referring to FIG. 4B, program 5 is assigned to broadcast channel 3 in mobile service area 1 and program 2 is assigned to broadcast channel 3 in mobile service area 2.

Referring back to FIG. 4A, since programs 2, 3, and 5 each have identical values, respectively, within mobile services areas 3-5, application device 220 may assign either of programs 2, 3, or 5 to broadcast channel 3.

Depending on the locations of mobile service areas, application device 220 may assign adjacent mobile service areas and programs to the broadcast channel. For example, if historical data indicates a regular migration of users between mobile service areas 3 and 4, then application device 220 may assign the same program to a broadcast channel for both mobile service areas 3 and 4.

For programs that are not assigned to a broadcast channel, application device 220 assigns the programs to a unicast channel, with the exception if a program is a subscription-based event, as described further below.

As described above, in this example, application device 220 identified a level of user viewership (e.g., numerical number of users) with respect to programs and mobile service areas. According to an exemplary embodiment, the program yielding the highest number of user viewers is assigned to a broadcast channel. According to another embodiment, other criterion may be applied, such as a threshold user viewership value, as well as other criterion described herein. Application device 220 may also consider the number of broadcast channels available as a resource and assign programs to broadcast channels in the most optimal way.

According to an exemplary embodiment, the network device determines between unicasting or broadcasting a program based on user voting. For example, referring back to FIG. 3, a web device 305 (e.g., an application server, a web server, etc.) may permit users to cast votes for programs that the users wish to have broadcasted. Since the broadcasting of programs is less expensive than the unicasting of programs, users may be encouraged to place their votes. The user voting information may be stored by database device 225. According to another exemplary embodiment, users may vote via a mobile application (e.g., a video player, an Interactive Programming Guide (IPG), etc.). The users' votes may be stored by database device 225.

Application device 220 may assign channels to programs based on the user voting information. For example, programs with the highest votes or above a particular voting threshold, which indicate a level of user popularity, may be assigned a broadcast channel. Alternatively, application device 220 may use both the user voting information and the user viewing information to assign programs to channels.

According to an exemplary embodiment, application device 220 may assign channels to programs based on whether the programs are sponsored events. For example, a sponsor (e.g., a content provider, an advertiser, a corporation, a company, etc.) may sponsor the broadcasting of a program. According to such a circumstance, the sponsor may pay a fee to the service provider for broadcasting the particular program. Sponsored program information may be received by ordering device 310 and stored by database device 225.

According to an exemplary embodiment, application device 220 may assign channels to programs based on whether the programs are subscription-based events. For example, unlike a sponsored event, a third party may attract users for subscribing to a program. The third party may pay a fee to the service provider for multicasting the particular program to the subscribed users. Users that subscribe to the program may receive a subscription code. The subscription code may permit the users to view the multicasting of the program. Similar to the previous example, subscription-based events may be received by ordering device 310 and stored by database device 225.

Figure 5:
FIG. 5 is a diagram of an exemplary interactive programming guide.

According to an exemplary embodiment, channel assignments are a part of an interactive programming guide. FIG. 5 is a diagram of an exemplary interactive programming guide. Each program 505 of the interactive programming guide includes metadata. For example, the metadata may include the program title (e.g., News 9 at Five), the time (e.g., 5 p.m. to 6 p.m.), and description (e.g., accessible when program 505 is selected). Additionally, the metadata includes a channel assignment. For example, the channel assignment may take the form of a Uniform Resource Locator (URL), a network address, etc., for unicast, multicast, or broadcast streaming of the program. The channel assignments of application device 220 are included in the interactive programming guide (e.g., as metadata). As described further below, when the user of user device (e.g., user device 250) initiates a connection (e.g., via a mobile application), the streaming of the program is based on the URL, the network address, etc. According to an exemplary embodiment, the channel assignment for a program may be a broadcast channel, a multicast channel, or a unicast channel. According to other embodiments, the program may include multiple channels (e.g., a broadcast channel and a unicast channel, etc.). According to an exemplary embodiment, the broadcast channel is given preference over a unicast channel for program delivery purposes.

Figure 6:
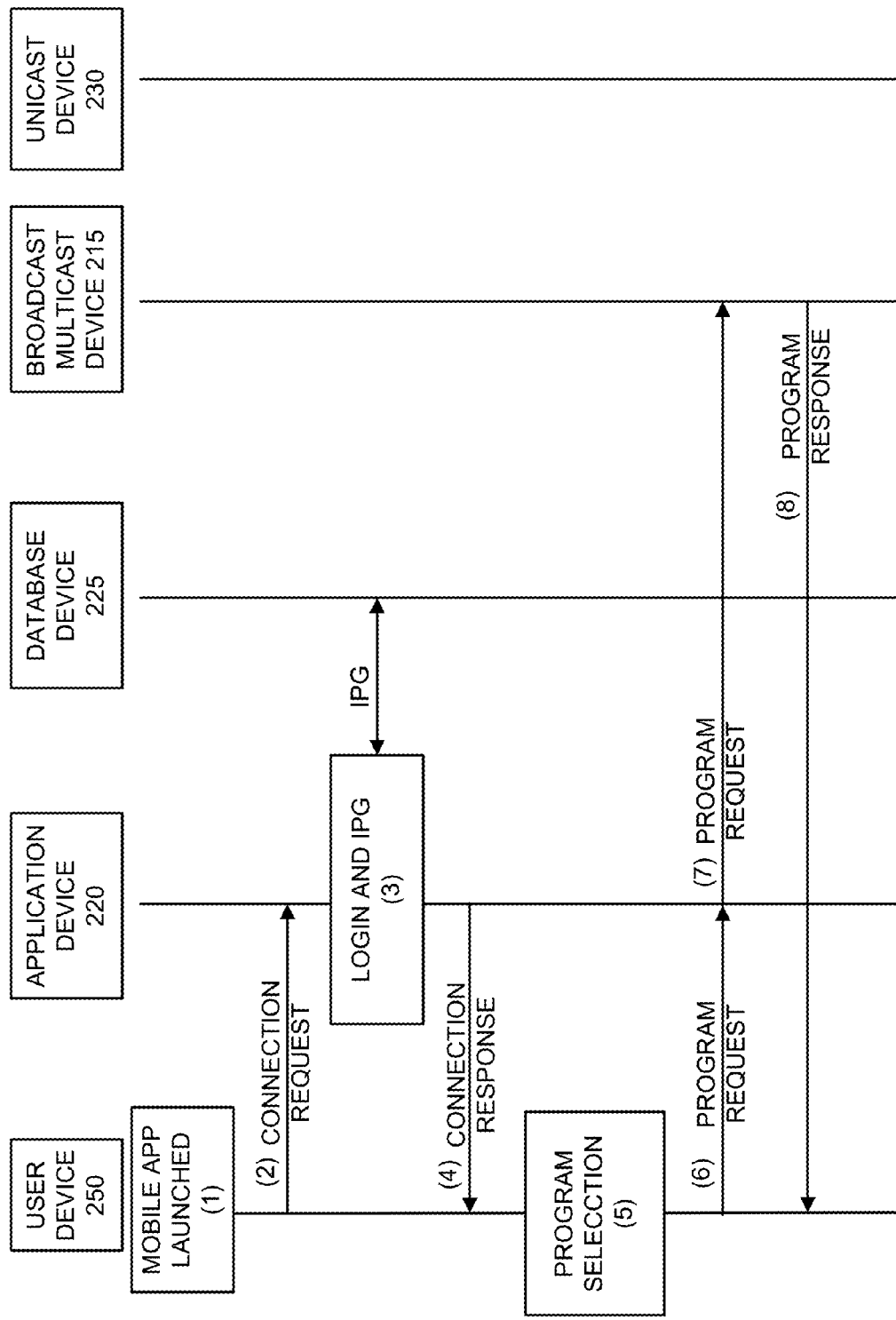
FIG. 6 is an exemplary messaging diagram pertaining to program delivery based on channel assignment.

FIG. 6 is an exemplary messaging diagram pertaining to program delivery based on channel assignment. As illustrated, in step (1), a mobile application of user device 250 is launched. For example, the mobile application may include a video player. During the start-up process, the mobile application generates and transmits a connection request, as illustrated in step (2). The connection request may include user login information. The connection request is received by application device 220. Application device 220 verifies the user login information to permit, for example, authentication and authorization, as illustrated in step (3). For example, although not illustrated, application device 220 may communicate with a user profile device (e.g., a Home Location Register (HLR) device, etc.). Application device 220 may also manage other aspects of the connection process, such as billing.

Additionally, application device 220 selects an interactive programming guide that includes the channel assignments. According to an exemplary embodiment, the interactive programming guide may be mobile service area-specific. That is, the channel assignments included in the interactive programming guide are for the mobile service area that user device 250 is located. According to such an embodiment, the mobile service area to which user device 250 is located is identified. According to an exemplary implementation, application device 220 may store the interactive programming guide. Alternatively, although not illustrated, application device 220 may obtain the interactive programming guide from database device 225.

In step (4), application device 220 transmits a connection response to user device 250. The connection response includes the interactive programming guide. In step (5), the user selects a program from the interactive programming guide. In this example, assume that the selected program is assigned a broadcast channel. Based on the user's program selection, a program request is transmitted to application device 220, as illustrated in step (6). Application device 220 transmits a program request to broadcast multicast device 215 so that a program session is established between user device 250 and broadcast multicast device 215, as illustrated in step (7). In step (8), the program request is received and the selected program is broadcast to user device 250 via broadcast multicast device 215.

Figure 7:
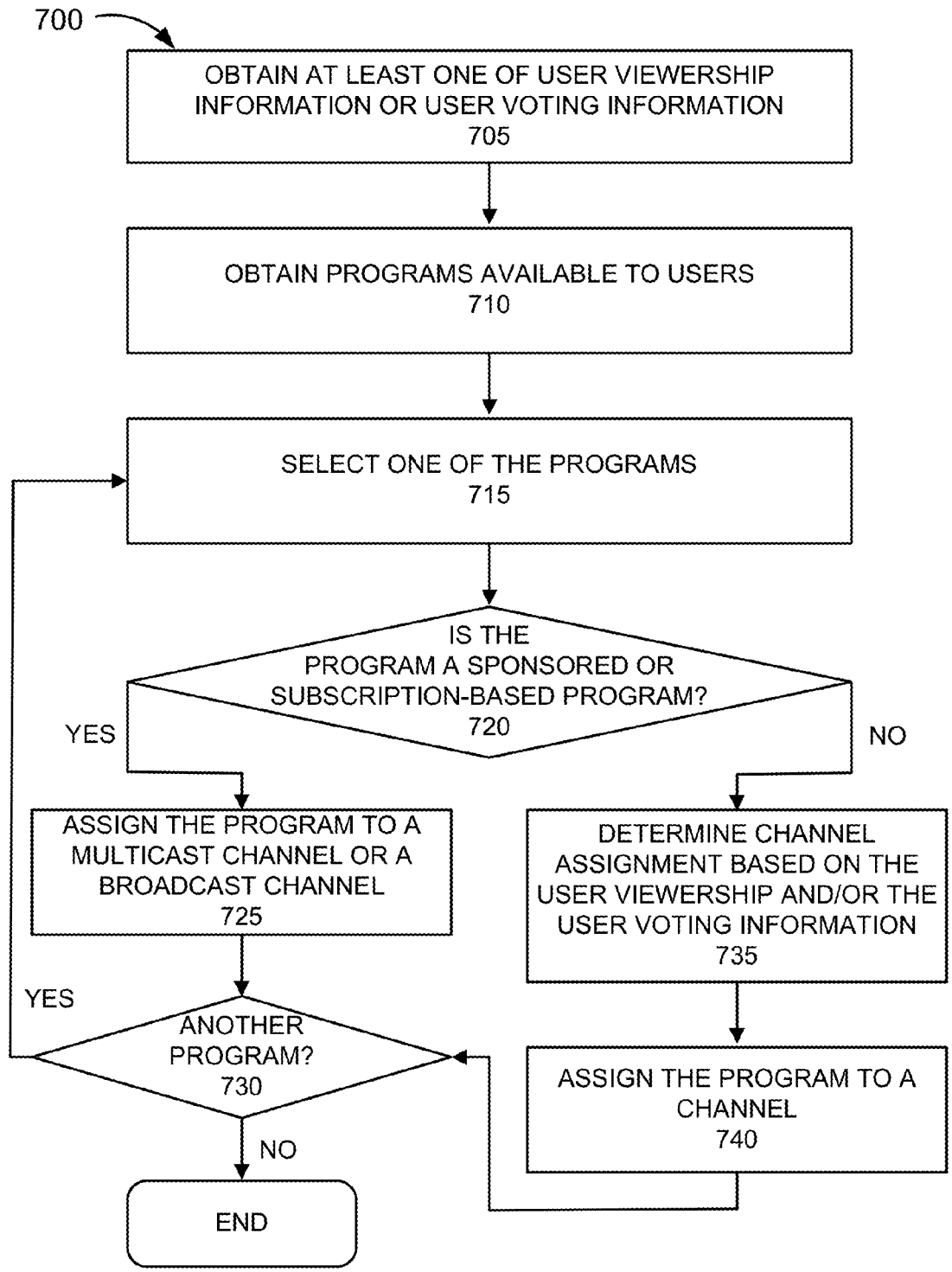
FIG. 7 is a flow diagram of an exemplary process for assigning channels to programs.

FIG. 7 is a flow diagram of an exemplary process 700 for assigning channels to programs. According to an exemplary embodiment, network device 110 (e.g., application device 220) may perform one or more of the steps described in process 700.

Referring to FIG. 7, in block 705, at least one of user viewership information or user voting information is obtained. For example, user viewership of programs in mobile service area information is obtained and stored by database device 225. Additionally, user voting of programs in mobile service area information is obtained and stored by database device 225.

In block 710, the programs available to users are obtained. For example, application device 220 may identify programs that should be assigned a channel (e.g., a broadcast channel, a unicast channel, and/or a multicast channel). This information may be obtained, for example, from a content device, which may include program schedule information, the interactive programming guide, and/or some other network device.

In block 715, one of the available programs is selected. For example, application device 220 selects one of the programs for channel assignment.

In block 720, it is determined whether the program is a sponsored program or a subscription-based program. By way of example, programs that are sponsored programs or subscription-based programs may be flagged. Application device 220 may recognize these types of programs to permit appropriate channel assignment. According to an exemplary embodiment, sponsored programs may be given a higher priority for assignment to a broadcast channel than non-sponsored programs. For example, application device 220 may select sponsored programs for channel assignment before non-sponsored programs to ensure broadcast channels are available and appropriate channel assignment occurs. In practice, this approach may be useful, particularly when the number of broadcast channels are limited (e.g., in a mobile service area), According to another embodiment, application device 220 may not adhere to the sponsored program priority scheme.

If it is determined that the program is a sponsored program or a subscription-based program (block 720—YES), the program is assigned a broadcast channel or a multicast channel (block 725). For example, application device 220 assigns the sponsored program to a broadcast channel and assigns the subscription-based program to a multicast channel. The channel assignment may pertain to multiple mobile service areas.

In block 730, it is determined whether another program is to be assigned a channel. For example, application device 220 identifies whether there are any remaining programs that need a channel assignment. If it is determined that there is another program for channel assignment (block 730—YES), then process 700 continues to block 715. If it is determined that there is not another program for channel assignment (block 730—NO), then process 700 ends.

Returning to block 720, if it is determined that the program is not a sponsored program or a subscription-based program (block 720—NO), then a channel assignment is determined based on the at least one of user viewership information or the user voting information (block 735). For example, as previously described, application device 220 calculates the channel assignment for a program of a mobile service area. According to an exemplary implementation, with reference to the user viewership information, application device 220 assigns the most viewed programs to a broadcast channel. Alternatively, application device 220 may assign a program to a broadcast channel based on a threshold number of users, a channel assignment of another mobile service area, and/or other criterion (e.g., genre of program, extent of advertising, etc.).

In block 740, the program is assigned to a channel. For example, application device 220 assigns a program to at least one of a broadcast channel or a unicast channel. Process 700 may continue to block 730 and proceed as previously described.

Although FIG. 7 illustrates an exemplary process 700 for assigning channels to programs, according to other embodiments, process 700 may include additional operations, fewer operations, and/or different operations than those illustrated in FIG. 7 and described herein.

As previously described, when a user moves from one mobile service area to another mobile service area, a handover may take place. For example, the user may move from a mobile service area that broadcasts the program to another mobile service area that unicasts the program, or vice versa. According to an exemplary embodiment, the handover is managed, at least in part, at the application layer. For example, a mobile application of the user device (e.g., user device 250) buffers the program for a time period equivalent to or substantially equivalent to the time period needed to perform the handover. In this way, the program session may continue with no or little interruption in mobile service when viewing the program. A further description is provided below.

Figure 8:
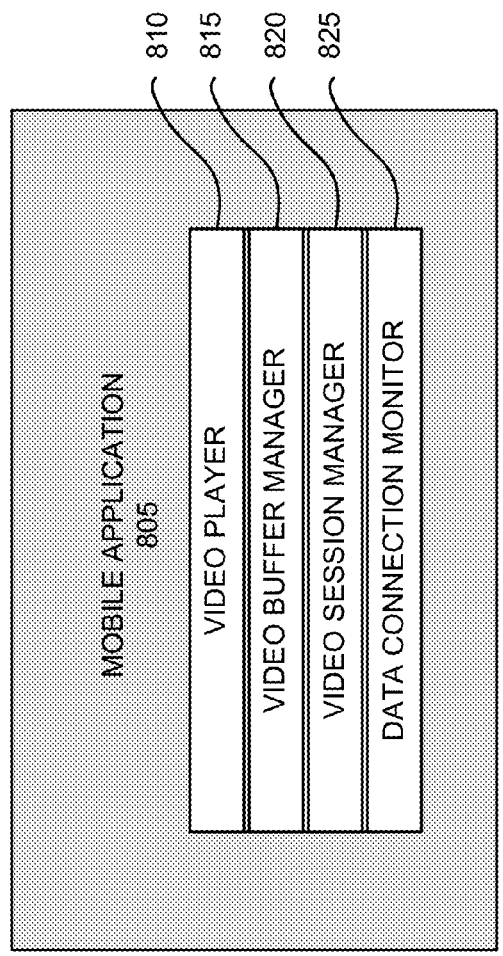
FIG. 8 is a diagram illustrating exemplary functional components of a mobile application of a user device.

FIG. 8 is a diagram illustrating exemplary functional components of a mobile application of user device 150 or user device 250. As illustrated, user device 150/250 includes a mobile application 805. The mobile application 805 includes a video player 810, a video buffer manager 815, a video session manager 820, and a data connection monitor 825. According to other embodiments, mobile application 805 may include additional functional components, fewer functional components, and/or different functional components. For example, video session manager 820 may not track the position of a program during the playing of the program. Additionally, or alternatively, data connection monitor 825 may not receive advance handover notifications. Rather, data connection monitor 825 may receive handover notifications normally provided according to the wireless communication standard being used, as described further below.

Video player 810 includes a multimedia player that is capable of playing programs (e.g., video). Video buffer manager 815 manages the buffering of a program. As described further below, video buffer manager 815 may buffer a program based on a handover time. Video session manager 820 manages the video session between user device 150/250 and network 105/205. According to an exemplary embodiment, video session manager 820 tracks the position of a program during the playing of the program. Video session tracking information may be used when user device 150/250 changes, for example, from a unicast connection to a broadcast connection, or vice versa, during a handover process. According to another embodiment, application device 220 performs video session tracking. Data connection monitor 825 monitors the state of a connection between user device 150/250 and network 105/205. As described further below, data connection monitor 825 manages advance handover notifications, which may be used to minimize the amount of buffering of a program.

Figure 9A:
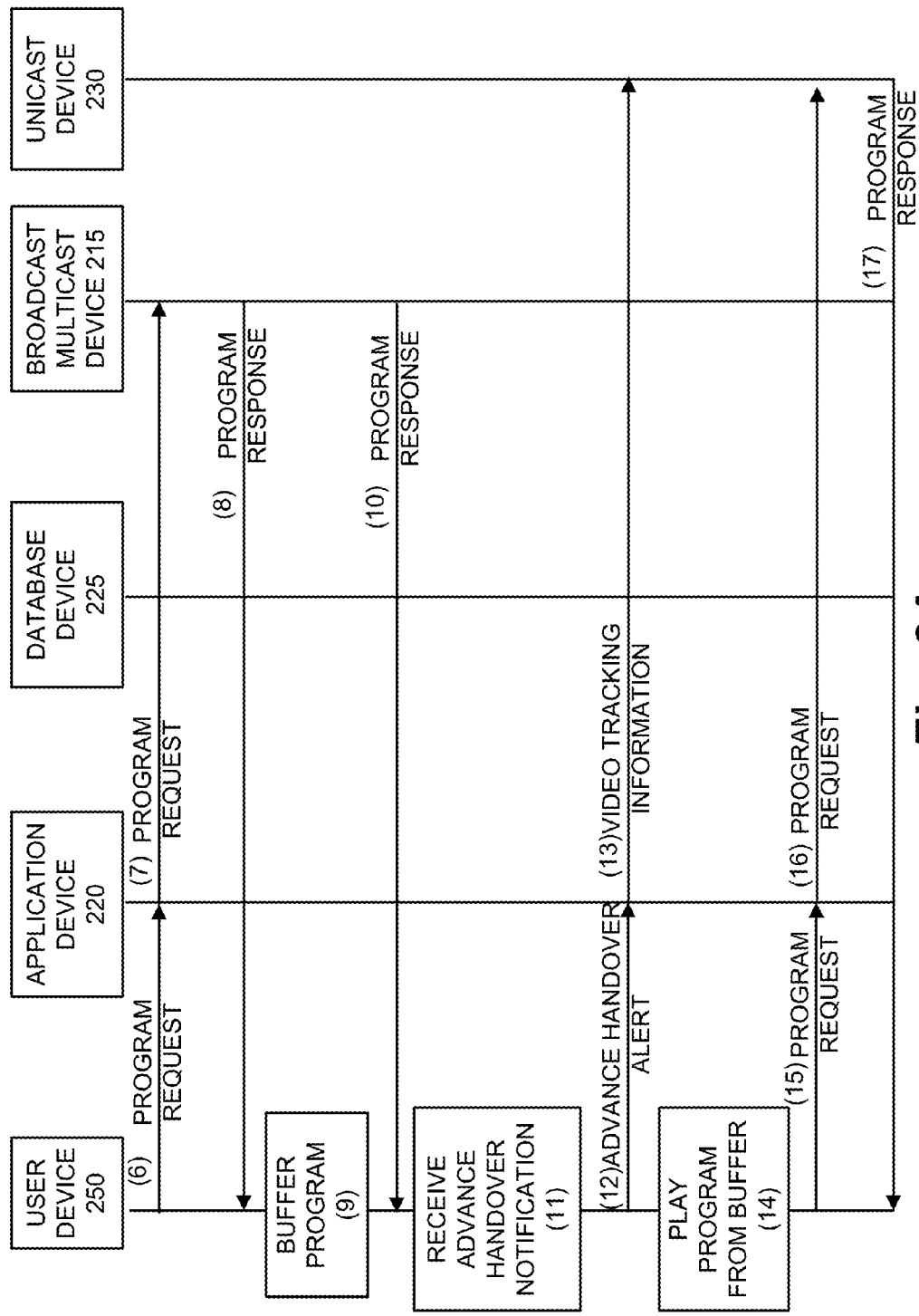
FIG. 9A is an exemplary messaging diagram pertaining to switching from a broadcast session to a unicast session.

Described below is an exemplary process for managing handover based on video buffering. FIG. 9A is an exemplary messaging diagram pertaining to switching from a broadcast session to a unicast session. For purposes of description, assume that user device 250 begins receiving a program based on a broadcast session in accordance with the steps previously described in relation to FIG. 6. As illustrated, in step (9), video buffer manager 815 of user device 250 buffers the program based on a handover time. In this example, the handover time is 15 seconds. In this way, if a handover occurs, video player 810 may continue to play the program from a buffer (e.g., a memory) while the handover takes place. As previously described, the buffer size depends on the network handoff time. According to an exemplary implementation, video buffer manager 815 buffers the program when first received. During this time, the user may not view the program. Thereafter, as illustrated in FIG. 9A, step (10), user device 250 continues to receive (e.g., streaming) the program from broadcast multicast device 215.

According to this exemplary scenario, assume the user moves toward another mobile service area that does not support or provide a broadcasting of the program. Rather, the other mobile service area supports or provides a unicasting of the program. According to an exemplary embodiment, user device 250 identifies the position of user device 250 relative to the boundaries of the mobile service area at which user device 250 is located. For example, user device 250 may calculate position based on a Global Positioning System (GPS) or other suitable location-aware system. User device 250 may predict when a handover may take place based on a speed and a direction associated with the user's mobility and current position relative to the boundaries of the mobile service area. According to such an embodiment, mobile application 805 receives an advance handover notification (e.g., an application programming interface (API) level notification, such as an original equipment manufacturer (OEM API) level notification) to permit user device 250 to initiate a unicast connection, as illustrated in steps (12 and 13). For example, the advance handover notification may be generated from another mobile application of user device 250. Alternatively, network 205 may calculate user device 250 position and predict the handover. According to such an embodiment, user device 250 may receive an advance handover notification via wireless device 210.

According to an exemplary embodiment, user device 250 may transmit an advance handover alert to application device 220, as illustrated in step (12). According to this example, application device 220 may be performing the video session tracking of the program. As illustrated in step (13), in response to receiving the advance handover alert, application device 220 transmits video tracking information to unicast device 230. The video tracking information may include, for example, a program identifier and a program position (e.g., a time code position, a data chunk identifier, etc.). According to another embodiment, user device 250 may track the video position of the program and transmit video tracking information to unicast device 230 or some other network device (not illustrated).

During the handover from a broadcast channel to a unicast channel, in this example, user device 250 (e.g., video player 810) plays the program from the video buffer, as illustrated in step (14). According to this example, the amount of buffer time of the program may be reduced, since user device 250 may prepare for the handover earlier in time. For example, at least some steps pertaining to a handover may be performed in parallel with the broadcasting of the program.

As illustrated in steps (15)-(17), user device 250 and unicast device 230 negotiate a unicast session, and the program is unicasted to user device 250 via unicast device 230.

Figure 9B:
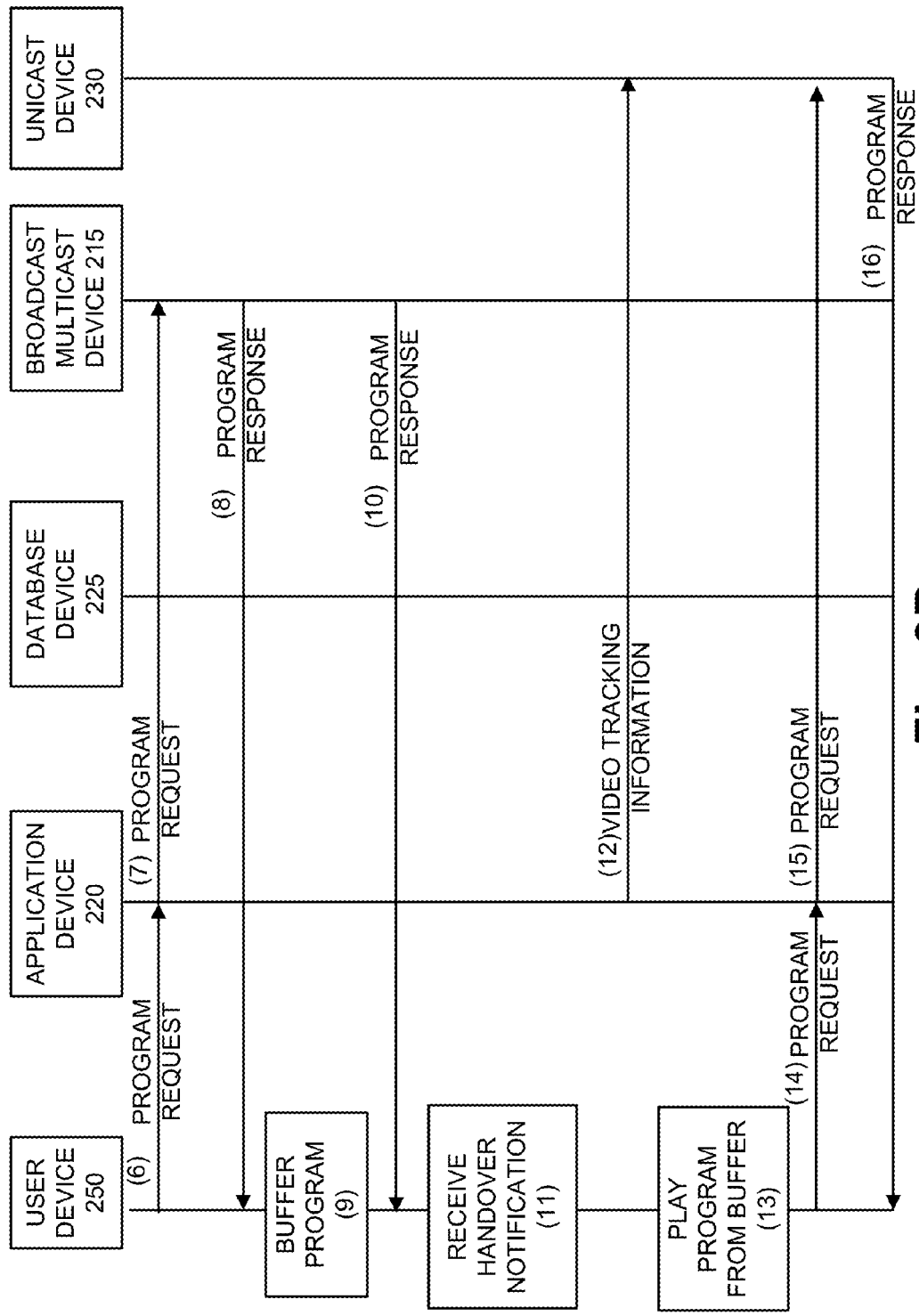
FIG. 9B is another exemplary messaging diagram pertaining to switching from a broadcast session to a unicast session.

Described below is another exemplary process for managing handover based on video buffering. FIG. 9B is an exemplary messaging diagram pertaining to switching from a broadcast session to a unicast session. In this example, an advance handover notification scheme is not used. Rather, user device 250 and/or wireless devices 210 detect when a handover is needed based on conventional downlink and/or uplink channel monitoring. Referring to step (11), when a broadcast connection becomes unavailable to user device 250, mobile application 805 receives a handover notification (e.g., an OEM level notification). Application device 220 transmits video tracking information to unicast device 230, as illustrated in step (12). During the handover from a broadcast channel to a unicast channel, user device 250 (e.g., video player 810) plays the program from the video buffer, as illustrated in step (13). As illustrated in steps (14)-(16), user device 250 and unicast device 230 negotiate a unicast session, and the program is unicasted to user device 250 via unicast device 230.

According to the exemplary handover processes illustrated and described in relation to FIGS. 9A and 9B, interruption of program delivery may be minimized. The handover is accomplished, at least in part, at the (mobile) application layer based on the video buffering by mobile application 805 of user device 250. Application device 220 may also contribute to the handover process (e.g., by providing video session tracking). In contrast to conventional approaches in which handover is performed at the lower levels (e.g., lower Open Systems Interconnection (OSI) levels, etc.), the handover process described herein may be performed at the application layer.

Although FIGS. 9A and 9B illustrates exemplary devices and messages, according to other embodiments, the messages and/or the devices may be different. For example, depending on the type of network and the network devices therein, the functionalities assigned to each network device, etc., various modifications may be implemented. Additionally, although FIGS. 9A and 9B have been described relating to switching from a broadcast session to a unicast session, the process may pertain to switching from a unicast session to a broadcast session, or other types of handover scenarios (e.g., unicast to unicast, multicast to multicast, etc.). However in some switching scenarios, the program stored by the video buffer on user device 250 cannot be continued from where the other connection ended. For example, when switching from a unicast channel to a multicast channel, the location of the program currently transmitted over the multicast channel may have already passed the program position saved by the video buffer. In this case, some piece of the program data is lost and the user has to experience some loss of the program (e.g., video frames).

There are various types of handovers, such as inter-cell, intra-cell, hard, soft, etc. The handover processes described herein are applicable to various types of handovers that may be performed in various types of networks.

Figure 10:
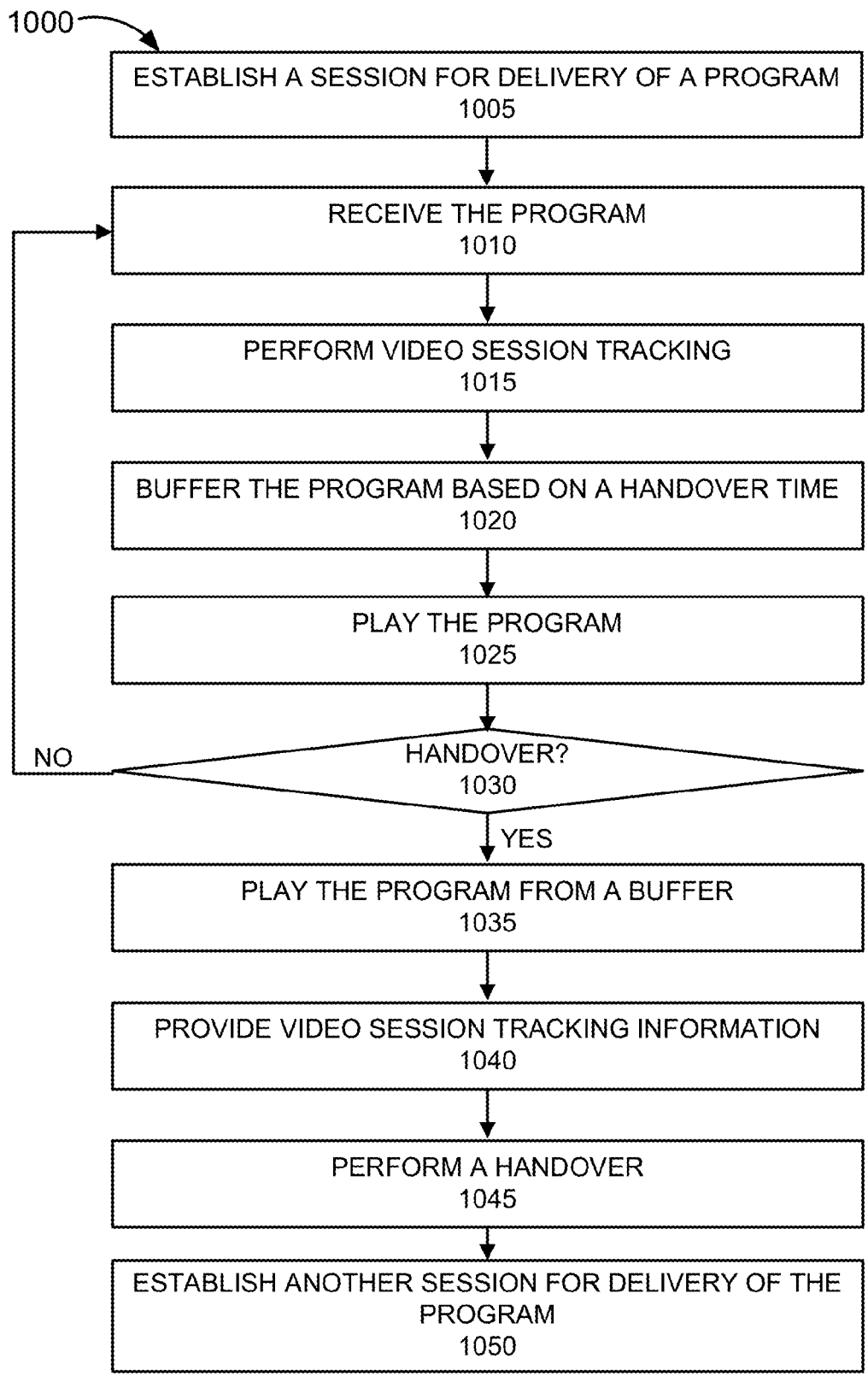
FIG. 10 is a flow diagram illustrating an exemplary handover process based on video buffering.

FIG. 10 is a flow diagram illustrating an exemplary handover process 1000 based on video buffering. According to an exemplary embodiment, user device 250 may perform one or more of the steps described in process 1000.

Referring to FIG. 10, in block 1005, a session for delivery of a program is established. For example, user device 250 negotiates a wireless connection with network 205 for receiving a program. Depending on the mobile service area at which user device 250 is located and the program, the wireless connection may be for receiving the program in a unicast, multicast, or broadcast manner.

In block 1010, the program is received. For example, user device 250 begins to receive a program selected by a user.

In block 1015, video session tracking is performed. For example, user device 250 tracks a position (e.g., a time-based position), amount (e.g., video chunk), or other suitable marker related to the receipt of streaming of the program.

In block 1020, the program is buffered based on a handover time. For example, user device 250 buffers a portion of the program equivalent to a handover time. The handover time may be a preconfigured value. As previously described, depending on whether the advanced handover notification scheme is used or not, the amount of buffering of the program vis-à-vis the handover time may vary.

In block 1025, the program is played. For example, user device 250 plays the program via a mobile application (e.g., mobile application 805).

In block 1030, it is determined whether a handover is needed. For example, user device 250 may identify when a handover is needed based on techniques applicable to a wireless network. Alternatively, user device 250 may identify, in advance, a handover, as previously described. A handover may be triggered when user device 250 moves from one mobile service area to another mobile service area.

If it is determined that a handover is not to take place (block 1030—NO), then process 1000 continues to block 1010. That is, user device 250 continues to receive the program, perform video session tracking, and buffer the program. If it is determined that a handover is to take place (block 1030—YES), then the program is played from a buffer (block 1035). For example, the mobile application plays a portion of the program that has been buffered.

In block 1040, video session tracking information is provided. For example, user device 250 provides video tracking information (e.g., a program identifier, a position of program) to a network device (e.g., broadcast multicast device 215, unicast device 230) to which the handover is be given.

In block 1045, the handover is performed. For example, user device 250 and network 205 coordinate a handover process.

In block 1050, another session for delivery of the program is established. For example, user device 250 negotiates a wireless connection with network 205 for receiving the program. Depending on the mobile service area at which user device 250 is located and the program, the wireless connection may be for receiving the program in a unicast, multicast, or broadcast manner.

Although FIG. 10 illustrates an exemplary process 1000 for performing a handover process based on video buffering, according to other embodiments, process 1000 may include additional operations, fewer operations, and/or different operations than those illustrated in FIG. 10 and described herein. Additionally, some operations described as being performed by user device 250 may be instead performed by a network device, or some combination thereof.

FIG. 11 is a diagram illustrating exemplary components of a device 1100 that may correspond to one or more of the devices in environments 100 and 200. As illustrated, according to an exemplary embodiment, device 1100 may include a processor 1105, memory/storage 1110 including an application 1115, a communication interface 1120, an input 1125, and an output 1130. According to other embodiments, device 1100 may include fewer components, additional components, different components, and/or a different arrangement of components than those illustrated in FIG. 11 and described herein.

Processor 1105 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 1105 may be implemented as hardware (e.g., a microprocessor, etc.), a combination of hardware and software (e.g., a SoC, etc.), may include one or multiple memories (e.g., memory/storage 1110), etc.

Processor 1105 may control the overall operation or a portion of operation(s) performed by device 1100. Processor 1105 may perform one or multiple operations based on an operating system and/or various applications (e.g., application 1115). Processor 1105 may access instructions from memory/storage 1110, from other components of device 1100, and/or from a source external to device 1100 (e.g., a network, another device, etc.).

Memory/storage 1110 includes one or multiple memories and/or one or multiple other types of storage mediums. For example, memory/storage 1110 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 1110 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 1110 may include drives for reading from and writing to the storage medium.

Memory/storage 1110 may be external to and/or removable from device 1200, such as, for example, a Universal Serial Bus (USB) memory stick, a dongle, a hard disk, mass storage, off-line storage, or some other type of storing medium (e.g., a computer-readable medium, a compact disk (CD), a digital versatile disk (DVD), a Blu-Ray® disk (BD), etc.). Memory/storage 1110 may store data, application(s), and/or instructions related to the operation of device 1100.

Application 1215 may include software or a program that provides various services and/or functions. For example, with reference to network devices 110 and according to an exemplary embodiment, application 1115 may include one or multiple applications or programs that provide program delivery services, as described herein. Additionally, with reference to user device 150/250 and according to an exemplary embodiment, application 215 may include one or multiple applications (e.g., mobile application 805, positioning application, advance handover services, etc.), as described herein.

Communication interface 1120 permits device 1100 to communicate with other devices, networks, systems, etc. Communication interface 1120 may include one or multiple wireless interfaces. Communication interface 1120 may include one or multiple transmitters, receivers, and/or transceivers. Communication interface 1120 may operate according to one or multiple protocols, standards, and/or the like.

Input 1125 may permit an input into device 1100. For example, input 1125 may include a keyboard, a mouse, a camera, a scanner, a microphone, a display, a touchpad, a touchscreen, a touchless screen, a button, a switch, an input port, voice recognition logic, speech recognition logic, fingerprint recognition logic, a web cam, and/or some other type of visual, auditory, tactile, etc., input component. Output 1130 may permit an output from device 1100. For example, output 1130 may include a speaker, a display, a touchscreen, a touchless screen, a light, an output port, and/or some other type of visual, auditory, tactile, etc., output component.

Device 1100 may perform processes and/or functions, as described herein, in response to processor 1105 executing instructions (e.g., application 1115) stored by memory/storage 1110. By way of example, the instructions may be read into memory/storage 1110 from another memory/storage 1110 or from another device via communication interface 1120. The instructions stored by memory/storage 1110 may cause processor 1105 to perform one or more processes described herein. Alternatively, for example, according to other implementations, device 1100 may perform one or more processes described herein based on the execution of hardware (processor 1105, etc.), the execution of hardware and firmware, or the execution of hardware, software, and firmware.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 7 and 10, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 1105, etc.), a combination of hardware and software (e.g., application 1115), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
   establishing, by a device, a wireless connection with a network;
   receiving, by the device, a stream of a video program via the network;
   buffering, by the device, upon initially receiving the stream, a portion of the video program based on a handover time;
   determining, by the device and subsequent to the buffering, whether a handover is to be performed; and
   playing, by the device, a buffered portion of the video program during an execution of the handover based on determining that the handover is to be performed.

2. The method of claim 1, wherein the handover includes receiving the video program from a mobile service area that broadcasts the video program to another mobile service area that unicasts the video program, or wherein the handover includes receiving the video program from a mobile service area that unicasts the video program to another mobile service area that broadcasts the video program.

3. The method of claim 2, further comprising:
   identifying a position of a user receiving the video program;
   identifying the position of the user relative to a boundary of the mobile service area;
   identifying a speed and a direction associated with the user's mobility; and
   predicting the handover based on the user's position, the position of the user relative to the boundary of the mobile service area, and the speed and the direction associated with the user's mobility.

4. The method of claim 3, wherein the buffering comprises:
   buffering the portion of the video program based on the handover time, wherein the handover time is based on a prediction of the handover.

5. The method of claim 1, further comprising:
   performing video program session tracking of the video program; and
   transmitting video session tracking information during the execution of the handover.

6. A mobile device comprising:
   a communication interface;
   one or more memories, wherein the one or more memories store instructions; and
   one or more processors, wherein the one or more processors execute the instructions to:

store a handover time;
establish, via the communication interface, a wireless connection with a network;
receive, via the communication interface, a stream of a video program via the network;
buffer, upon initially receiving the stream, a portion of the video program based on the stored handover time;
determine, subsequent to buffering, whether a handover is to be performed; and
play a buffered portion of the video program during an execution of the handover based on a determination that the handover is to be performed.

7. The mobile device of claim 6, wherein the one or more processors further execute the instructions to:
receive, via the communication interface, an interactive programming guide;
receive a user selection of the video program via the interactive programming guide; and
establish, via the communication interface, a connection with one of a unicast device or a broadcast device to receive the video program, wherein a network address of the unicast device or the broadcast device is associated with the video program included in the interactive programming guide.

8. The mobile device of claim 6, wherein the one or more processors further execute the instructions to:
identify a position of the mobile device relative to a boundary of a mobile service area associated with the network;
identify a speed and a direction associated with the mobile device;
predict the handover based on the position of the mobile device relative to the boundary of the mobile service area and the speed and the direction associated with the mobile device;
generate an advanced handover notification; and
communicate the advanced handover notification to a mobile application playing the video program, wherein the stored handover time is based on a time associated with a predicted handover.

9. The mobile device of claim 6, wherein the one or more processors further execute the instructions to:
perform video program session tracking of the video program; and
transmit, via the communication interface, video session tracking information during the execution of the handover.

10. A non-transitory storage medium storing instructions executable by a computational device, wherein the instructions include instructions for:
storing a handover time;
establishing a wireless connection with a network;
receiving a stream of a video program via the network;
buffering, upon initially receiving the stream, a portion of the video program based on the stored handover time;
determining, subsequent to the buffering, whether a handover is to be performed; and
playing a buffered portion of the video program during an execution of the handover based on determining that the handover is to be performed.

11. The non-transitory storage medium of claim 10, further storing instructions for:
performing video program session tracking of the video program.

12. The non-transitory storage medium of claim 10, further storing instructions for:
buffering the portion of the video program based on the handover time, wherein the handover time is based on a prediction of the handover.

13. The non-transitory storage medium of claim 10, wherein the handover includes receiving the video program from a mobile service area that broadcasts the video program to another mobile service area that unicasts the video program, or wherein the handover includes receiving the video program from a mobile service area that unicasts the video program to another mobile service area that broadcasts the video program.

14. The method of claim 1, further comprising:
playing the video program; and
buffering another portion of the video program of the stream based on the handover time.

15. The method of claim 1, further comprising:
performing the handover, wherein the handover includes one of an inter-cell handover, an intra-cell handover, a hard handover, or a soft handover, and wherein during a time of the buffering, a user of the device is unable to view the video program.

16. The mobile device of claim 6, wherein the one or more processors further execute the instructions to:
play the stream of the video program; and
buffer another portion of the video program of the stream based on the handover time.

17. The mobile device of claim 6, wherein the one or more processors further execute the instructions to:
prevent a playing of the video program until the portion of the video program is buffered.

18. The mobile device of claim 6, wherein the one or more processors further execute the instructions to:
perform the handover, wherein the handover includes one of an inter-cell handover, an intra-cell handover, a hard handover, or a soft handover.

19. The non-transitory storage medium of claim 10, further storing instructions for:
playing the stream of the video program; and
buffering another portion of the video program of the stream based on the handover time.

20. The non-transitory storage medium of claim 10, further storing instructions for:
preventing a playing of the video program until the portion of the video program is buffered.

* * * * *